(12) United States Patent
Na

(10) Patent No.: US 10,044,219 B2
(45) Date of Patent: Aug. 7, 2018

(54) POWER SUPPLY APPARATUS

(71) Applicant: LSIS CO., LTD., Gyeonggi-do (KR)

(72) Inventor: Jung-Bin Na, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 38 days.

(21) Appl. No.: 15/170,150

(22) Filed: Jun. 1, 2016

(65) Prior Publication Data

US 2016/0359360 A1 Dec. 8, 2016

(30) Foreign Application Priority Data

Jun. 2, 2015 (KR) .................. 10-2015-0077708

(51) Int. Cl.
*H02J 9/00* (2006.01)
*H02J 9/06* (2006.01)
*H02J 7/34* (2006.01)
*G06F 1/30* (2006.01)

(52) U.S. Cl.
CPC ............ *H02J 9/061* (2013.01); *G06F 1/30* (2013.01); *H02J 7/345* (2013.01)

(58) Field of Classification Search
CPC .................. H02J 9/061; H02J 7/345
USPC ..................................... 307/64–66
See application file for complete search history.

(56) References Cited

U.S. PATENT DOCUMENTS

| | | |
|---|---|---|
| 6,437,544 B1 | 8/2002 | Yang |
| 9,024,592 B2 | 5/2015 | Jeon et al. |
| 2011/0062777 A1* | 3/2011 | Sotnikow ............ H02J 7/1423 307/9.1 |
| 2011/0121210 A1 | 5/2011 | Oono et al. |
| 2012/0112546 A1* | 5/2012 | Culver ................ H02J 7/0029 307/66 |
| 2013/0246815 A1* | 9/2013 | Uehara ................ H02J 9/061 713/300 |
| 2014/0172182 A1* | 6/2014 | Subbotin ............. H02J 3/383 700/291 |

(Continued)

FOREIGN PATENT DOCUMENTS

| | | |
|---|---|---|
| CN | 2383263 Y | 6/2000 |
| CN | 200976505 Y | 11/2007 |

(Continued)

OTHER PUBLICATIONS

Chinese Office Action for related Chinese Application No. 201610390515.6; action dated Mar. 2, 2018; (5 pages).

*Primary Examiner* — Alfonso Perez Borroto
(74) *Attorney, Agent, or Firm* — K&L Gates LLP

(57) ABSTRACT

Disclosed herein are embodiments of a power supply apparatus. In some embodiments, the power supply apparatus supplies power to a load including a programmable logic controller (PLC) and includes: a first power storing module comprising a first auxiliary power source; and a second power storing module including a second auxiliary power source. An output voltage from the second power storing module may be larger than an output voltage from the first power storing module. It is possible to prevent an accident such as memory data loss possibly occurring in the event of sudden power-off by way of reducing usage of a battery that has limited lifetime while utilizing the advantage of super capacitor that has a very high number of charge/discharge cycles.

11 Claims, 5 Drawing Sheets

(56) References Cited

U.S. PATENT DOCUMENTS

2015/0108831 A1\* 4/2015 Gonzalez, Jr. ........ B60R 16/033
307/9.1

FOREIGN PATENT DOCUMENTS

| CN | 201063455 Y | 5/2008 |
| --- | --- | --- |
| CN | 101615861 A | 12/2009 |
| JP | 2005-261149 A | 9/2005 |
| KR | 10-2010-0034291 A | 4/2010 |
| KR | 10-2010-0065999 A | 6/2010 |
| KR | 10-2011-0022870 A | 3/2011 |
| KR | 10-2012-0120706 A | 11/2012 |
| KR | 10-1529173 B1 | 6/2015 |
| WO | 9814848 | 4/1998 |

\* cited by examiner

PRIOR ART

POWER SUPPLY APPARATUS

CROSS REFERENCE TO RELATED APPLICATIONS

This application claims the benefit of Korean Patent Application No. 10-2015-0077708, filed on Jun. 2, 2015, entitled "POWER SUPPLY APPARATUS", which is hereby incorporated by reference in its entirety.

BACKGROUND

1. Technical Field

The present disclosure relates to a power supply apparatus. More specifically, the present disclosure relates to a power supply apparatus capable of supplying power for a programmable logic controller (PLC), especially power for PLC memory backup and RTC operation even in an event of power-off by way of utilizing advantages of a battery module and a super capacitor module.

2. Description of the Related Art

In a programmable logic controller (PLC), a variety of devices such as ferroelectrics RAM (FRAM), a flash memory, etc., are used for data backup such as user programs or documents, etc. Such devices have to be able to store data even after their functional modules are tuned off. Among others, a FRAM has advantages in that it has fast data write time and does not require additional battery backup. However, its cost increases with memory capacity and there is a limit on data storage capacity. A flash memory, on the other hand, has larger data storage capacity and is less expensive, but it takes longer data write time. Because of such issues of data storage capacity and data write time, a fast SRAM device is frequently used since it is cheap. A SRAM requires a battery and a circuit for backup to keep supplying power. A SRAM and the like receive power from an internal or external power supply. Power supplies may be household or industrial power supplies (e.g., 110 V service, 220 V service, etc.), or may be an internal adaptor or charging device. Non-volatile memories such as a SRAM may be critically damaged, e.g., data loss if a power supply is suddenly turned off. In order to prevent this, manufactures have developed a variety of backup power supplies to cope with sudden power-off of power supplies.

Even in a PLC system, functional modules including a central processing unit (CPU) module that require data backup include their own batteries and circuits for backup. Such a battery and a circuit for backup included in each of the functional modules monitor the level of signals from the main power source. If the level of signals is out of a normal range, power is supplied to a variety of backup devices that need to be supplied with power such as an SRAM or real-time clock (RTC), thereby preserving data.

As shown in FIG. 1, for a typical backup power supply apparatus using a battery, a battery has limited lifetime, and the battery is rapidly discharged after a particular lifetime. Accordingly, batteries have to be replaced periodically due to limited lifetime, and thus maintenance cost incurs for replacing batteries.

SUMMARY

It is an aspect of some embodiments of the present disclosure to provide a power supply apparatus capable of supplying power for PLC memory backup and RTC operation by utilizing a battery module and a super capacitor module.

In addition, it is another aspect of some embodiments of the present disclosure to provide a power supply apparatus that utilizes the advantages of a battery module that reduces battery usage and a super capacitor module that has a very high number of charge/discharge cycles.

Moreover, it is another aspect of some embodiments of the present disclosure to provide a power supply apparatus that capable of preventing an accident such as memory data loss or interruption of a RTC possibly occurring in the event of sudden power-off by way of utilizing a battery module and a super capacitor together.

In accordance with one aspect of the present disclosure, a power supply apparatus is configured to supply an auxiliary power to a load when a main power supplied to the load is interrupted in an event of power-off. The apparatus includes: a first power storing module comprising a first auxiliary power source; and a second power storing module comprising a second auxiliary power source. An output voltage from the second power storing module is larger than an output voltage from the first power storing module.

The first auxiliary power source may be a battery.

The second auxiliary power source may be a super capacitor.

The first power storing module may include a first unidirectional device unit that is connected to the first auxiliary power source and includes unidirectional current-conducting devices toward a first output terminal.

The second power storing module may include a second unidirectional device unit. The second unidirectional device unit may include a third unidirectional device that is disposed between a supply voltage and the second auxiliary power source and is a unidirectional current-conducting device toward the second auxiliary power source, and a fourth unidirectional device that is disposed between the second auxiliary power source and a second output terminal and is a unidirectional current-conducting device toward the second output terminal.

A first resistor may be further disposed between the second unidirectional device unit and the second auxiliary power source.

The unidirectional current-conducting devices may be diodes.

The number of the first unidirectional device units may be larger than a number of the second unidirectional device units.

The power supply apparatus may further include: a third power storing module for supplying the main power to the load.

The third power storing module may include a first transistor and a second transistor that receive the supply voltage and are turned on in response to a predetermined control signal to supply the supply voltage to the PLC.

The base of the second transistor may receive the supply voltage via the second resistor. The collector of the second transistor may be connected to the base of the first transistor via a third resistor.

The collector of the first transistor may be connected to an output terminal of the third power storing module, and the output terminal of the third power storing module, a first output terminal of the first power storing module, and a second output terminal of the second power storing module may be electrically connected to one another.

DETAILED DESCRIPTION

Embodiments of the present disclosure will now be described in detail with reference to the accompanying drawings. However, it is to be understood that the present disclosure is not limited to the specific embodiments, but includes all modifications, equivalents, and substitutions included in the spirit and the scope of the present disclosure.

Hereinafter, embodiments of the present disclosure will be described in detail with reference to the accompanying drawings. Like reference numbers are used herein to designate like elements throughout the various views.

Figure 1:
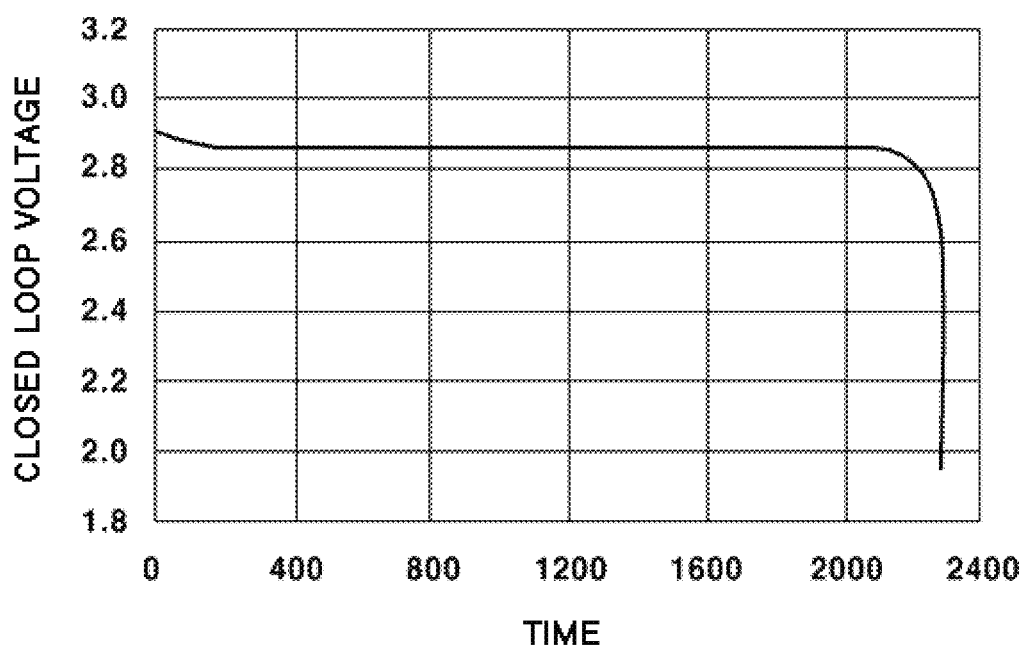
FIG. 1 is a graph showing discharge characteristics of a battery, according to prior art.
Figure 2:
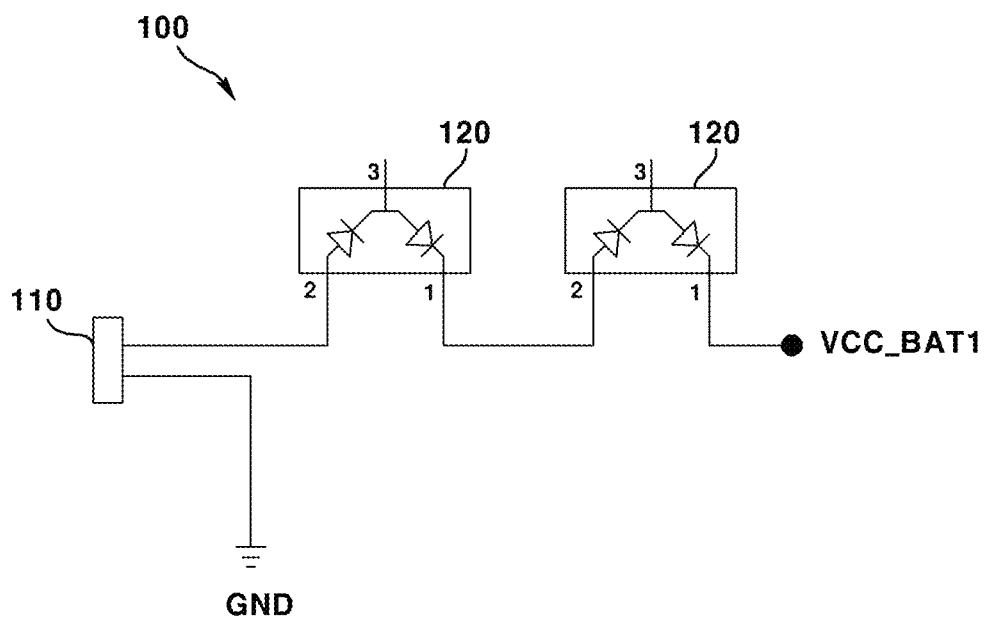
FIG. 2 is a block diagram of a first power storing module of a power supply apparatus according to an embodiment of the present disclosure.

FIG. 2 is a block diagram of a first auxiliary power storing module 100 of a power supply apparatus according to an embodiment of the present disclosure. The first auxiliary power storing module 100 stores auxiliary power to be supplied to a load and includes a first auxiliary power source 110. The first auxiliary power source 110 may be a battery. In addition, the first auxiliary power storing module 100 includes first unidirectional device units 120 disposed between the first auxiliary power source 110 and a first output terminal Vcc_BAT1. The first unidirectional devices are connected to the first auxiliary power source 110 and are unidirectional current-conducting devices toward the first output terminal Vcc_BAT1. The first unidirectional devices may be diodes, for example. Although the two first unidirectional device units 120 are shown in FIG. 2, this is merely an example and the number of the first unidirectional device units 120 is not limited two. The number of the first unidirectional device units 120 may be determined depending on the design purpose and use.

Figure 3:
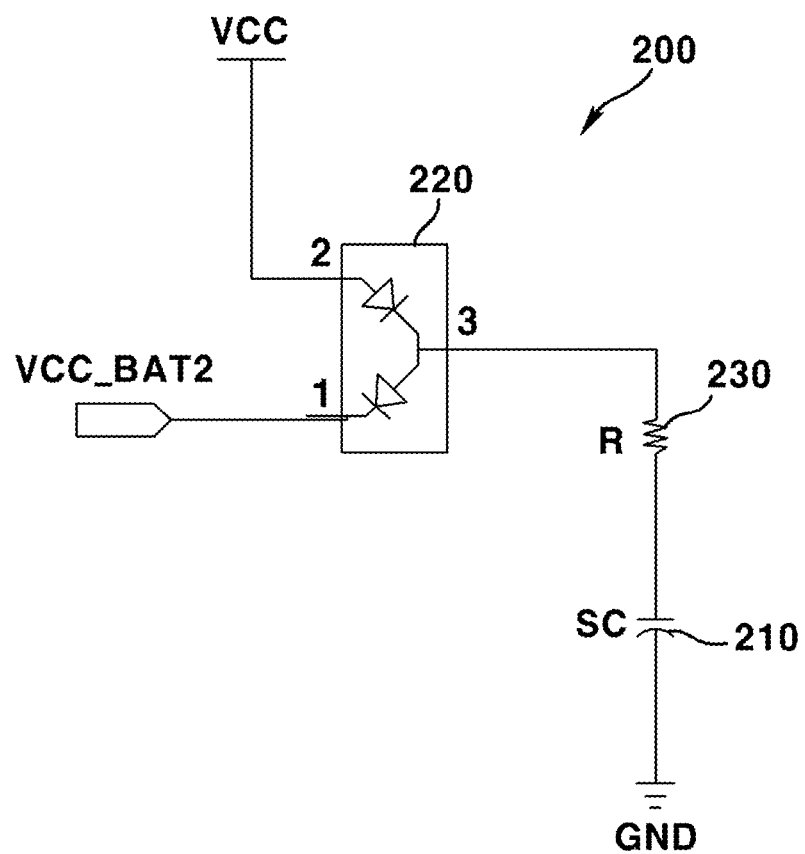
FIG. 3 is a block diagram of a second power storing module of a power supply apparatus according to an embodiment of the present disclosure.

FIG. 3 is a block diagram of a second auxiliary power storing module 200 of a power supply apparatus according to an embodiment of the present disclosure. The second auxiliary power storing module 200 receives a Supply Voltage Vcc to store auxiliary power to be supplied to a load 230, which may include a programmable logic controller (PLC), and includes a second auxiliary power source 210. The second auxiliary power source 210 may be a super capacitor SC. In addition, the second auxiliary power storing module 200 may further include a second unidirectional device unit 220. The second unidirectional device unit 220 may include a third unidirectional device that is disposed between the Supply Voltage Vcc and the second auxiliary power source 210 and is a unidirectional current-conducting device toward the second auxiliary power source 210. In addition, the second unidirectional device unit 220 may include a fourth unidirectional device that is disposed between the second auxiliary power source 210 and a second output terminal Vcc_BAT2 and is a unidirectional current-conducting device toward the second output terminal Vcc_BAT2. The unidirectional devices may be, for example, diodes. FIG. 3 shows merely an example, and the number of the unidirectional devices of the second auxiliary power storing module 200 is not limited to two but may vary.

Figure 4:
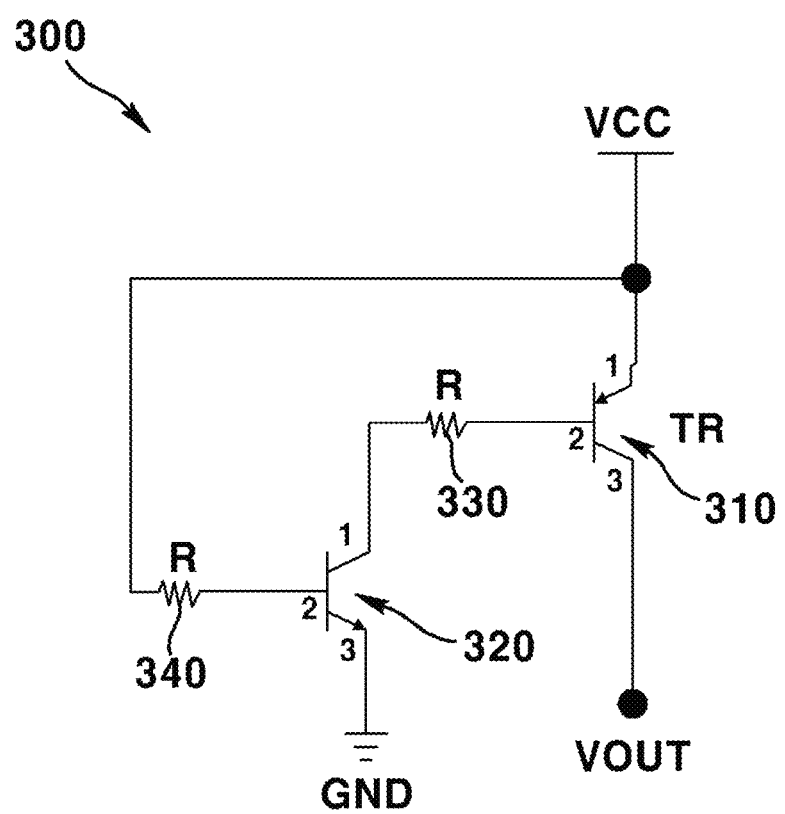
FIG. 4 is a block diagram of a main power storing module of a power supply apparatus according to an embodiment of the present disclosure.

FIG. 4 is a block diagram of a main power storing module 300 of a power supply apparatus according to an embodiment of the present disclosure. The main power storing module 300 stores main power to be supplied to a load and receives the supply voltage Vcc to output it to the load via a third output terminal Vout. The main power storing module 300 includes a switch unit that receives the supply voltage Vcc and is turned on to supply a voltage to a load in response to a predetermined control signal. The switch unit includes a first transistor 310 and a second transistor 320. The emitter E of the first transistor 310 is connected to the Vcc terminal. The collector C of the first transistor 310 is connected to the third output terminal Vout. The collector C of the second transistor 320 is connected to the base B of the first transistor 310 via a second resistor 330. The base B of the second transistor 320 may receive the supply voltage Vcc via a third resistor 340.

Figure 5:
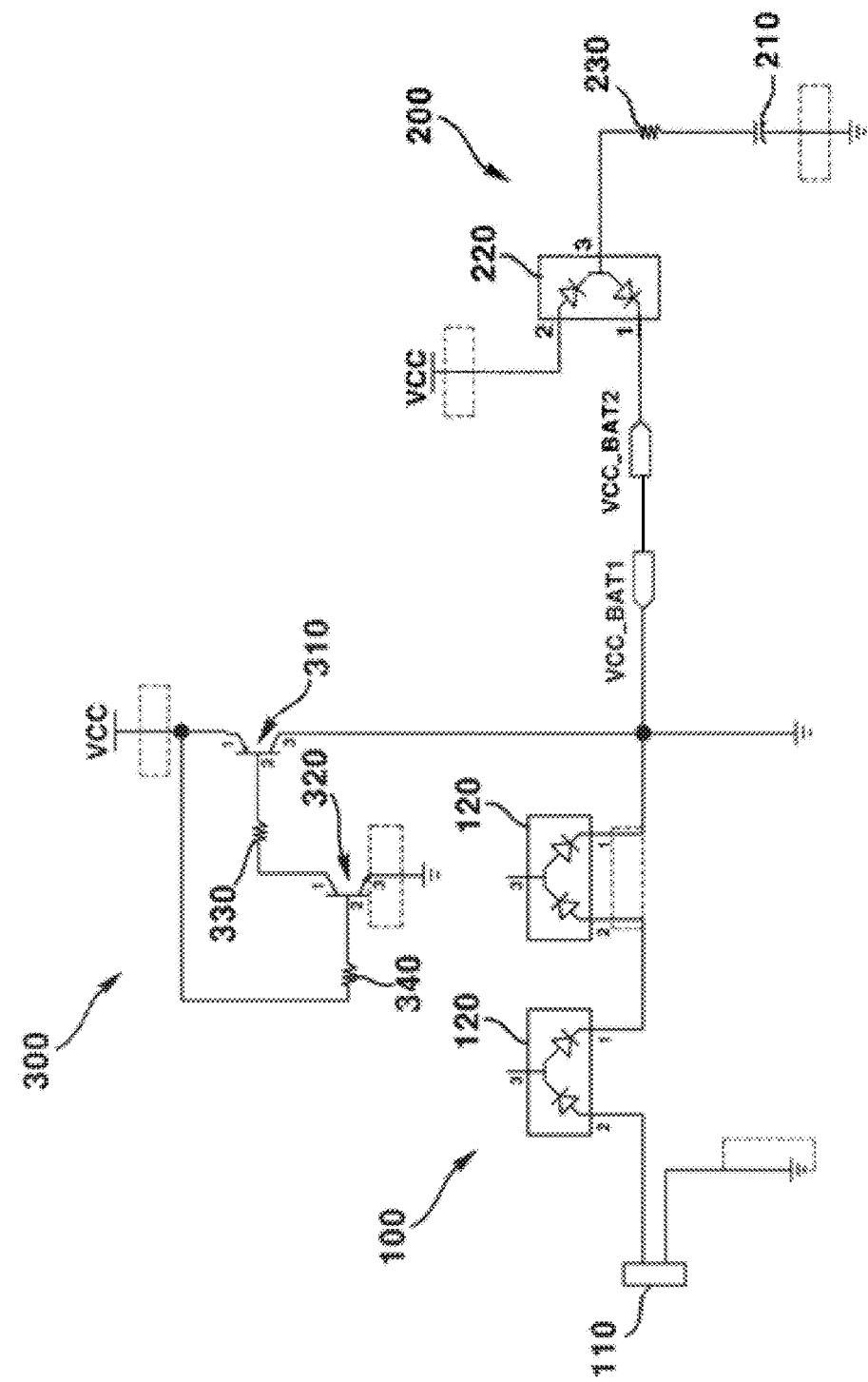
FIG. 5 is a block diagram of a power supply apparatus according to an embodiment of the present disclosure.

FIG. 5 is a block diagram of a power supply apparatus according to an embodiment of the present disclosure. An operation of the power supply apparatus according to an embodiment of the present disclosure will be described with reference to FIG. 5. The power supply apparatus according to the embodiment of the present disclosure includes the main power storing module 300, the first auxiliary power storing module 100 and the second auxiliary power storing module 200. The first output terminal Vcc_BAT1 of the first auxiliary power storing module 100, the second output terminal Vcc_BAT2 of the second auxiliary power storing module 200, and the output terminal of the main power storing module 300 are electrically connected to one another, thereby supplying power to a load.

The load is normally driving with the main power supplied from the main power storing module 300, and if the main power is interrupted due to sudden power off or the like, the auxiliary power is supplied to the load from the auxiliary power storing module. The voltage at the output terminal of the second auxiliary power storing module 200 is set to be higher than the voltage at the output terminal of the first auxiliary power storing module 100. The voltage Vcc_BAT1 at the output terminal of the first auxiliary power storing module 100 and the voltage Vcc_BAT2 at the output terminal of the second auxiliary power storing module 200 are calculated as follows:

$$Vcc\_BAT1 = Vsub1 - Vd1 * n$$

$$Vcc\_BAT2 = (Vsub2 - Vd2) * \text{capacitor margin ratio} \quad \text{[Equation 1]}$$

where Vsub1 denotes the voltage of the first auxiliary power source 110, Vsub2 denotes the voltage of the second auxiliary power source 210, Vd1 denotes the forward voltage of the first unidirectional device units 120, Vd2 denotes the forward voltage of the second unidirectional device unit 220, and n denotes the number of the first unidirectional device units.

The current I consumed by the data storing system according to the embodiment of the present disclosure for backing up an SRAM and operating a RTC can be expressed as Equation 2 below:

$$\text{Consumed Current } I = \text{SRAM backup current} + \text{RTC operation current} + \text{reverse leakage current of TR} \quad \text{[Equation 2]}$$

Further, the lifetime of the first auxiliary power source, e.g., a battery can be expressed as Equation 3 below:

$$\text{Lifetime} = (\text{used current}/\text{consumed current})/24 \text{ h}/365 \text{ d} \quad \text{[Equation 3]}$$

Further, the backup time (t) of the second auxiliary power source, e.g., a super capacitor can be expressed as Equation 4 below:

The total amount of electric charges ($Q$)=the capacity of super capacitor*($Vcc\_BAT2 - Vcc\_BAT1$).

$$t = Q/I \quad \text{[Equation 4]}$$

where I denotes consumed current.

For example, in the example shown in FIG. 5, if Vsub1=3V, Vd1=0.35V, n=2, Vsub2=3.3V, Vd2=0.15, and cap margin =0.9, Vcc_BAT1=2.3V, Vcc_BAT2=2.835V according to Equation 1, and consumed current I is 7 μA according to Equation 2. The lifetime of the battery is approximately 4.08 year according to Equation 3, and the backup time of the super capacitor is 4.42 day according to Equation 4.

That is, according to the embodiment of the present disclosure, it is possible to prevent an accident such as memory data loss or interruption of a RTC possibly occurring in the event of sudden power-off by way of reducing usage of a battery that has limited lifetime while utilizing the advantage of super capacitor that has a very high number of charge/discharge cycles According to an embodiment of the present disclosure, it is possible to supply power for memory backup and RTC operation stably even in the event of power-off In addition, according to an embodiment of the present disclosure, it is possible to significantly reduce the battery usage by utilizing a battery module and a super capacitor module. Moreover, it is possible to save cost incurred for replacing batteries periodically.

In addition, according to an embodiment of the present disclosure, an accident such as memory data loss or interruption of RTC operation possibly occurring when power supply is interrupted, and thus the stability of storing data can be improved.

According to an embodiment of the present disclosure, it is possible to supply power for memory backup and RTC operation stably even in the event of power-off.

In addition, according to an embodiment of the present disclosure, it is possible to significantly reduce the battery usage by utilizing a battery module and a super capacitor module. Moreover, it is possible to save cost incurred for replacing batteries periodically.

In addition, according to an embodiment of the present disclosure, an accident such as memory data loss or interruption of RTC operation possibly occurring when power supply is interrupted, and thus the stability of storing data can be improved.

Although the embodiments of the present disclosure have been described in detail, these are merely illustrative. It will be appreciated by those skilled in the art that various modifications and equivalents are possible without departing from the scope of the present disclosure. Accordingly, the true scope of the present disclosure sought to be protected is defined only by the appended claims.

What is claimed is:

1. A power supply apparatus configured to supply an auxiliary power to a programmable logic controller (PLC) when a main power supplied to the PLC is interrupted in an event of power-off, the apparatus comprising:

a first power storing module comprising a first auxiliary power source;

a second power storing module comprising a second auxiliary power source, wherein an output voltage from the second power storing module is larger than an output voltage from the first power storing module; and wherein the second power storing module comprises a second unidirectional device unit, wherein the second unidirectional device unit comprises (i) a third unidirectional device that is disposed between a supply voltage and the second auxiliary power source and is a unidirectional current-conducting device toward the second auxiliary power source, and (ii) a fourth unidirectional device that is disposed between the second auxiliary power source and a second output terminal and is a unidirectional current-conducting device toward the second output terminal.

2. The power supply apparatus of claim 1, wherein the first auxiliary power source includes a battery, and the second auxiliary power source includes a super capacitor.

3. The power supply apparatus of claim 1, wherein the first power storing module comprises a first unidirectional device unit that is connected to the first auxiliary power source and composed of unidirectional current-conducting devices toward a first output terminal.

4. The power supply apparatus of claim 1, wherein a first resistor is further disposed between the second unidirectional device unit and the second auxiliary power source.

5. The power supply apparatus of claim 3, wherein the unidirectional current-conducting devices are diodes.

6. The power supply apparatus of claim 1, wherein the second unidirectional device unit includes diodes.

7. The power supply apparatus of claim 5, wherein a number of the first unidirectional device units is larger than a number of at least one second unidirectional device unit.

8. The power supply apparatus of claim 1, further comprising: a third power storing module for supplying the main power to the PLC.

9. The power supply apparatus of claim 8, wherein the third power storing module comprises a first transistor and a second transistor that receive the supply voltage and are turned on in response to a predetermined control signal to supply the supply voltage to the PLC.

10. The power supply apparatus of claim 9, wherein a collector of the second transistor is connected to a base of the first transistor via a second resistor, and a base of the second transistor receives the supply voltage via a third resistor.

11. The power supply apparatus of claim 10, wherein a collector of the first transistor is connected to an output terminal of the third power storing module, and the output terminal of the third power storing module, a first output terminal of the first power storing module, and a second output terminal of the second power storing module are electrically connected to one another.

* * * * *